United States Patent [19]

Greatbatch

[11] 4,272,098
[45] Jun. 9, 1981

[54] WEIGHT TRANSFER HITCH

[75] Inventor: Robert J. Greatbatch, Spalding, England

[73] Assignee: Weight Distribution Limited, Hong Hong, Hong Kong

[21] Appl. No.: 931,365

[22] Filed: Aug. 7, 1978

[30] Foreign Application Priority Data

Aug. 12, 1977 [GB] United Kingdom ............... 33960/77

[51] Int. Cl.$^3$ .............................................. B60D 7/00
[52] U.S. Cl. ................................. 280/494; 280/405 B
[58] Field of Search ............ 280/492, 493, 494, 405 B

[56] References Cited

U.S. PATENT DOCUMENTS

| 1,990,731 | 2/1935 | Greer | 280/492 X |
| 2,091,009 | 8/1937 | Osman | 280/492 |
| 2,937,886 | 5/1960 | Poole | 280/492 |
| 3,049,365 | 8/1962 | Kirchler | 280/492 |
| 3,059,714 | 10/1962 | Johnson | 280/492 X |
| 4,082,310 | 4/1978 | Hawk | 280/492 |

FOREIGN PATENT DOCUMENTS

| 1108482 | 1/1956 | France | 280/492 |
| 1279422 | 11/1961 | France | 280/405 B |
| 1302660 | 7/1962 | France | 280/494 |
| 1420786 | 1/1976 | United Kingdom | 280/492 |

Primary Examiner—John P. Silverstrim
Attorney, Agent, or Firm—Fitch, Even, Tabin, Flannery & Welsh

[57] ABSTRACT

A vehicle coupling comprises a linkage pivotably attachable to a first vehicle about a transverse horizontal axis, and a bearing assembly. The bearing assembly has a vertically disposed pivot bearing for connecting the vehicle coupling to a coupling member attached to a second vehicle. The vertically disposed pivot bearing has a first part fixed to the vehicle coupling and a second part fixed to the coupling member. Said first part of the vertical bearing is mounted above the linkage by support means incorporating a horizontal pivot bearing whose axis is perpendicular to the transverse horizontal axis. The vehicle coupling is such that the weight transference of the second vehicle to the first vehicle acts down through the axis of the vertically disposed pivot bearing, and such that the foremost vertical surface of the vertically disposed pivot bearing is situated nearer to the vertical plane containing the transverse horizontal axis than any other part of the vehicle coupling which is above the axis of the horizontal pivot bearing.

14 Claims, 11 Drawing Figures

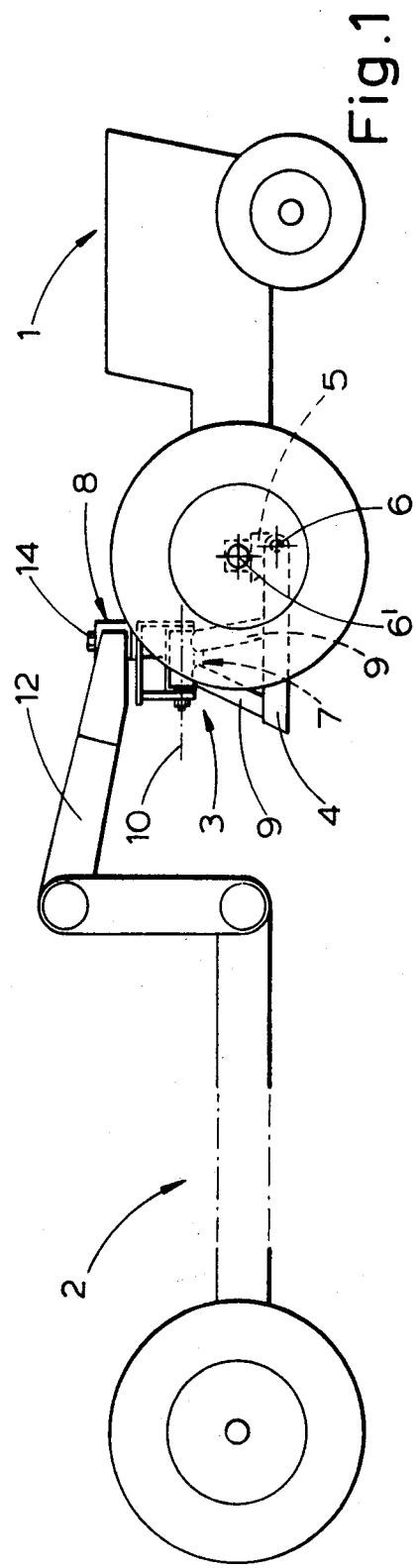
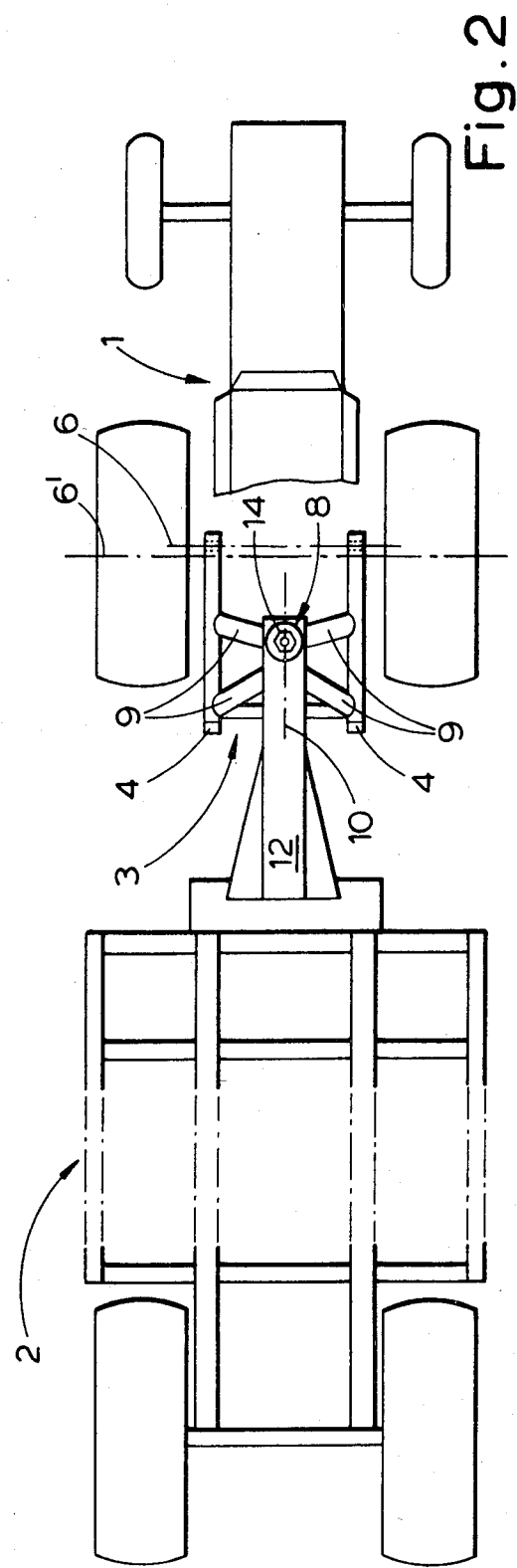

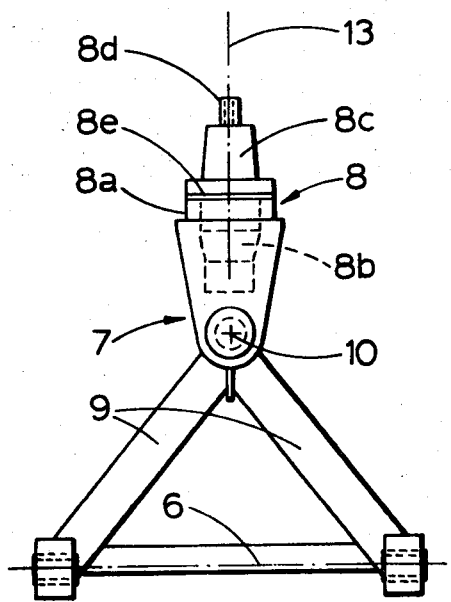
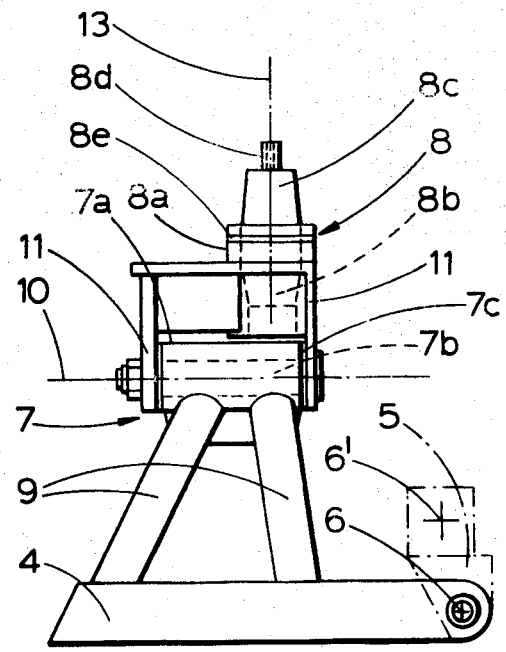
Fig. 3
Fig. 4
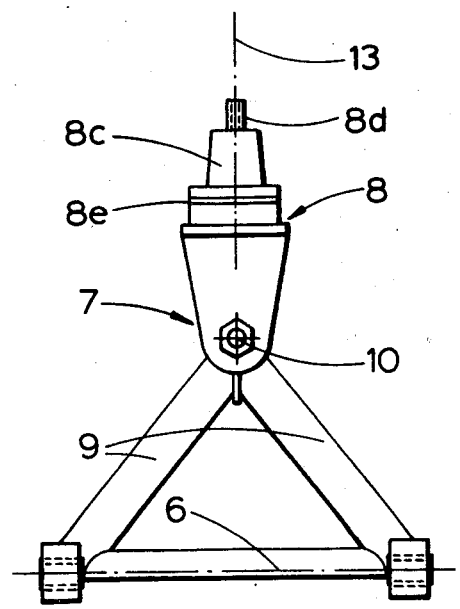
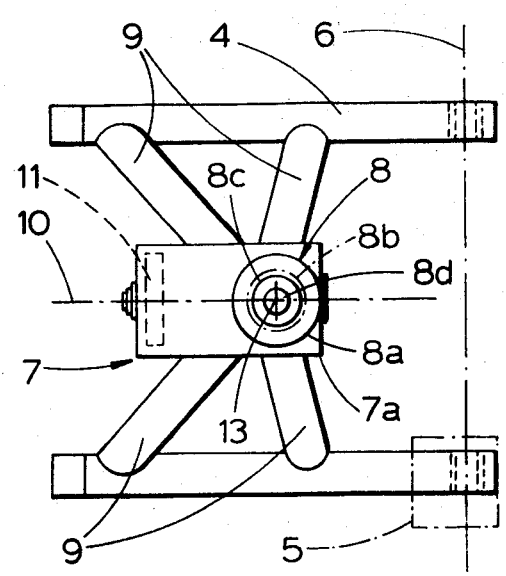
Fig. 5
Fig. 6

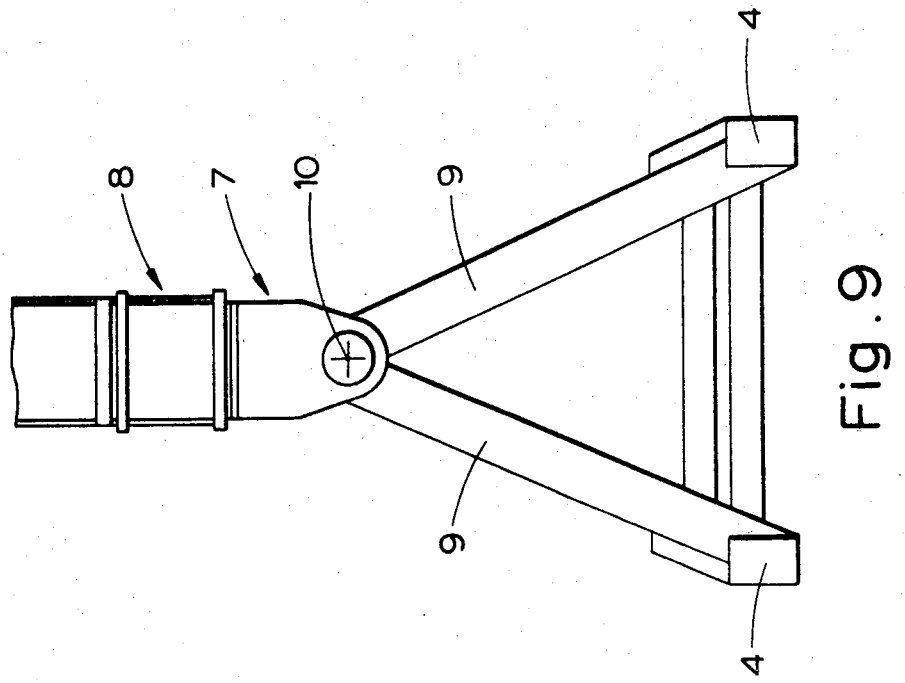
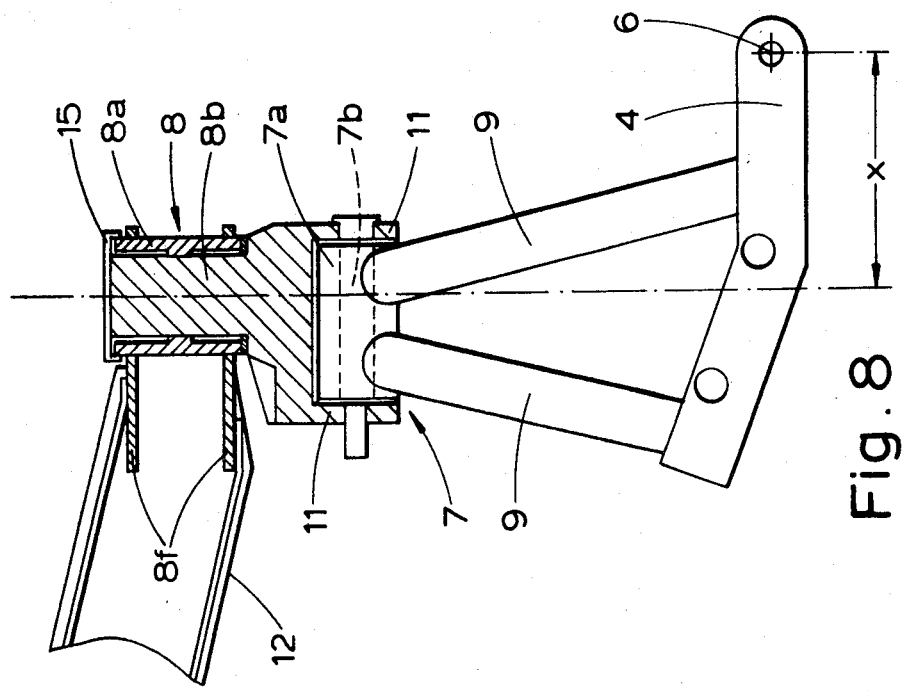

WEIGHT TRANSFER HITCH

BACKGROUND TO THE INVENTION

This invention relates to a vehicle coupling in the form of a weight transfer hitch for releasably connecting two vehicles such as a tractor and its trailer.

Although the agricultural tractor was developed mainly as a tool for cultivation, it is unrivalled as an efficient and economical prime mover, provided that a large proportion of its available power can be converted to tractive effort. This tractive effort can be expressed either as "available" rimpull or "usable" rimpull. "Available" rimpull is dependent upon the horsepower of the tractor engine, and "usable" rimpull (which is the important factor in determining the load which can be pulled by the tractor) is the product of the weight on the driving wheels of the tractor and the coefficient of friction between the driving wheels and the surface of the ground. With the use of rubber tyres, the coefficient of friction varies between about 0.9 on dry concrete to about 0.12 on ice. In the worst operating conditions in, for example, a cane field, the coefficient of friction may be expected to range between 0.3 and 0.4. Thus, an agricultural tractor having a rear axle weight of 3,500 lbs., operating on a muddy surface, may be expected to generate "usable" rimpull in the range of 1,050 to 1,400 lbs., which would be bearly sufficient to overcome the rolling resistance of a vehicle with a gross weight of only 5 tons.

An obvious solution to the shortage of "usable" rimpull is to utilise the payload to increase the weight on the driving wheels, and almost every single-axle agricultural trailer employs this principle. In most cases, however, the improvement is limited, since the weight is transferred to a point behind the centre line of the rear axle of the tractor, tending to cause the front wheels to lift clear off the ground.

Weight transfer couplings have been developed to transfer such weights within the tractor wheel base, with spectacular improvements in "usable" rimpull. For example, the "usable" rimpull developed by the tractor described above would be increased to between 3,750 and 5,000 lbs., permitting a payload of up to 10 tons in the very poor conditions described above. Such a weight transfer coupling usually includes three mutually perpendicular pivots so as to accommodate relative pitching, rolling and yawing movements between a tractor and its trailer. Unfortunately, known weight transfer couplings suffer from stability disadvantages, particularly during cornering. These stability problems arise from the natural constraints relating to the positioning of the three axes. Thus, the humping axis must be within the wheelbase of the tractor, and the yawing pivot must be connected to the trailer. However, to increase stability, the yawing axis must be as near as possible to the humping axis, and known couplings have been unsatisfactory in this respect mainly because of the positioning of the rolling pivot and its support means.

SUMMARY OF THE INVENTION

The present invention provides a vehicle coupling comprising a linkage pivotably attachable to a first vehicle about a transverse horizontal axis, and a vertically disposed pivot bearing for connecting the vehicle coupling to a coupling member attached to a second vehicle, the vertically disposed pivot bearing having a first part fixed to the vehicle coupling and a second part fixed to the coupling member, said first part being mounted above the linkage by support means incorporating a horizontal pivot bearing whose axis is perpendicular to the transverse horizontal axis, the vehicle coupling being such that, in use, the weight transference of the second vehicle to the first vehicle acts down through the axis of the vertically disposed pivot bearing, and such that the foremost vertical surface of the vertically disposed pivot bearing is situated nearer to the vertical plane containing the transverse horizontal axis than any other part of the vehicle coupling which is above the axis of the horizontal pivot bearing.

In this vehicle coupling, the transverse horizontal axis constitutes the humping or pitching axis, the axis of the vertically disposed pivot bearing constitutes the yawing axis, and the axis of the horizontal pivot bearing constitutes the rolling axis. Obviously, the orientation of these axes varies during use of the vehicle coupling. Throughout this specification, however, the axes are defined as though the coupling was in position between the two vehicles with the vehicles in line and on a horizontal flat surface. With this coupling, the axis of the yawing pivot can be as close to the humping axis as one wants, with the proviso that sufficient spacing must exist for humping through an angle of about 18° to occur.

Preferably, the horizontal pivot bearing is positioned vertically below the base of the vertically disposed pivot bearing. This means that the weight also acts down through the horizontal pivot bearing and results in a better transmission of the forces through this bearing.

Said first part may be a vertically disposed pivot bearing sleeve and said second part may be a pivot pin which depends from the coupling member. Alternatively, said first part may be a pivot pin and said second part may be a vertically disposed pivot bearing sleeve.

Advantageously, the linkage is constituted by a pair of parallel arms, one end of each of which is pivotably attachable to the first vehicle about said transverse horizontal axis. In this case, the support means may be constituted by two pairs of obliquely inclined, convergent struts, the wider spaced ends of the struts of each pair being fixed to a respective one of the arms, and the other ends of the struts being fixed to the sleeve of the horizontal pivot bearing. Alternatively, the support means may be constituted by a pair of horizontal struts, the ends of the struts being fixed respectively to the arms. Either of these arrangements of the linkage and the support means utilises simple, straight metallic sections (which may be either tubular or solid) which can be welded together or connected in any other convenient manner. This simple and cheap construction is to be compared with the equivalent part of known vehicle couplings, which require a complicated and costly arrangement such as an A-frame for the linkage, and which require complicated and/or cantilevered constructions for the support means.

Preferably, the distance between the top of the vertically disposed pivot bearing and the axis of the horizontal pivot bearing is less than half the inside rear tyre spacing of the first vehicle. Where the first vehicle is a tractor and the second vehicle is a trailer, this ensures that, in the unlikely event of the trailer turning over, the top of the coupling will not strike the adjacent rear tyre of the tractor and so will not cause the tractor to overturn with the trailer.

Advantageously, the vertically disposed pivot bearing sleeve is a plain sleeve. Alternatively this sleeve may house needle rollers. In either case, its internal diameter may be 6 inches, so that a steel shaft having a diameter of 6 inches may constitute the pivot pin.

Preferably, the horizontal pivot bearing is constituted by a horizontal pivot bearing sleeve fixed to the support means, and by a pivot pin the two ends of which are fixed to said first part of the vertically disposed pivot bearing by means of brackets. This arrangement ensures that the horizontal pivot bearing provides adequate support for the vertically disposed pivot bearing. Moreover, the pivot pin of the horizontal pivot bearing is supported in double shear which was not the case with some prior art couplings in which the horizontal pivot bearing was cantilevered from the support means. Where said first part is a pivot pin, it may be integral with said brackets.

BRIEF DESCRIPTION OF THE DRAWINGS

Several forms of vehicle coupling constructed in accordance with the invention will now be described, by way of example, with reference to the accompanying drawings, in which:

FIG. 1 is a diagrammatic side elevation of a first form of vehicle coupling in position between a tractor and a trailer;

FIG. 2 is a plan view of the arrangement shown in FIG. 1;

FIG. 3 is an end elevation of the first form of vehicle coupling looking from the tractor;

FIG. 4 is a side elevation of the first form of vehicle coupling;

FIG. 5 is an end elevation of the first form of vehicle coupling looking from the trailer;

FIG. 6 is a plan view of the first form of vehicle coupling;

FIG. 8 is a part-sectional side elevation of a third form of vehicle coupling;

FIG. 9 is an end elevation of the third form of vehicle coupling looking from the tractor;

DESCRIPTION OF PREFERRED EMBODIMENTS

Figure 7:
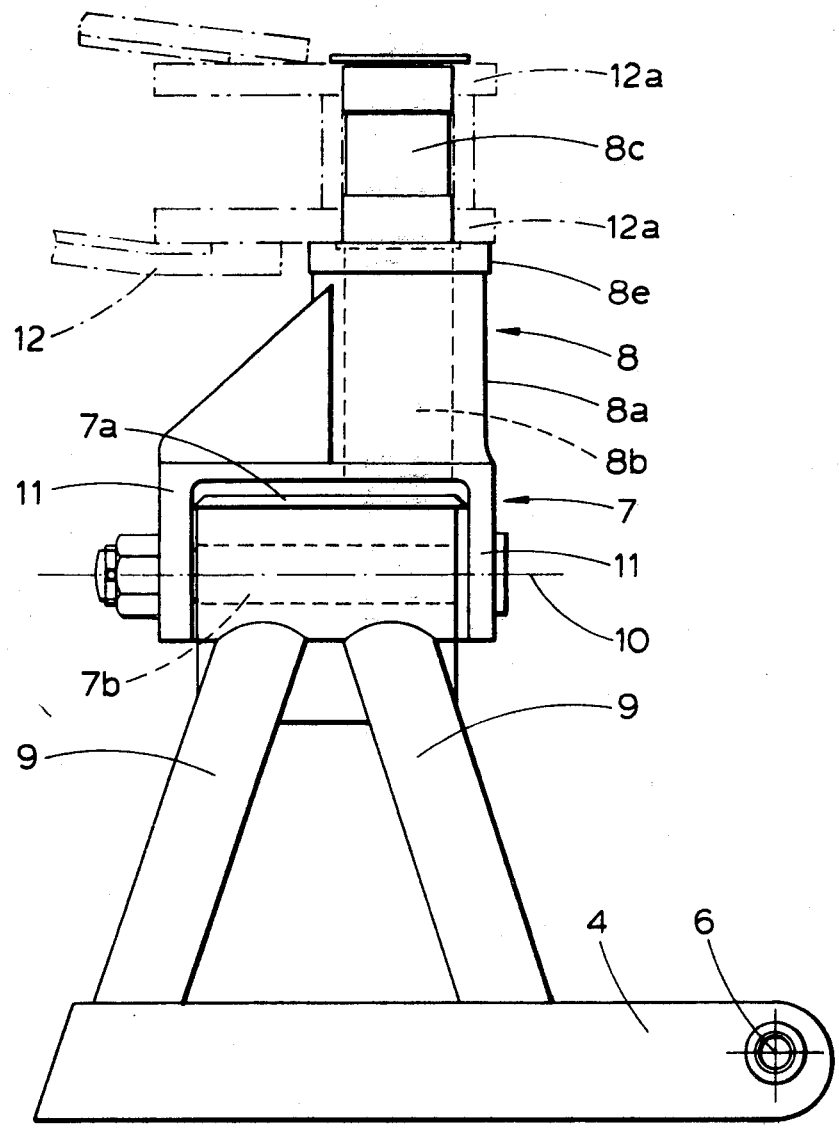
FIG. 7 is a side elevation of a second form of vehicle coupling.

Referring to the drawings, FIGS. 1 and 2 show a tractor 1 connected to a trailer 2 by means of a coupling indicated generally by the reference numeral 3. The coupling 3 has a pair of parallel support arms 4 which are pivotably mounted to the tractor 1 by means of axle brackets 5. As can best be seen in FIGS. 1,2 and 4, the axis 6 (the humping or pitching axis) about which the arms 4 pivot is positioned slightly forward of the axis 6' of the rear axle of the tractor 1. This ensures that the weight transferred by the coupling acts within the wheel base of the tractor 1 so that there is no tendency for the front wheels of the tractor to lift clear of the ground.

The arms 4 support a pair of pivot bearings 7 and 8 by means of four struts 9. The pivot bearing 7 comprises a bearing sleeve 7a fixed to the struts 9 and a pivot pin 7b. The axis 10 (the rolling axis) of the bearing 7 is horizontal and perpendicular to the humping axis 6. The bearing 8 comprises a vertical bearing sleeve 8a, supported on the pivot pin 7b by means of brackets 11, and a pivot pin 8b which is rigidly attached to a draw bar 12 of the trailer 2. The axis 13 (the yawing axis) of the bearing 8 is thus vertical and mutually perpendicular to the humping axis 6 and the rolling axis 10.

The pivot pin 8b is a steel shaft having a diameter of 6 inches and a tapered portion towards its base. A tapered boss 8c is provided at its top and a threaded shank 8d is provided at the top of the boss. The boss 8c mates with a correspondingly tapered hole (not shown) in the free end of the draw bar 12, and the pin 8b is rigidly fastened to the draw bar by means of a nut 14 (see FIGS. 1 and 2). Obviously, the pivot pin 8b could be fastened to the draw bar 12 in any other suitable way, for example by welding. The particular attachment described has, however, the advantage that the pivot pin 8b can easily be replaced when worn. The bearing 7 also includes a thrust bearing 7c for taking up traction forces and the bearing 8 includes a thrust bearing 8e for taking up forces arising from the transferred weight.

The arms 4 and the struts 9 are preferably made from round or square section steel, and may be either bars or tubular. The arms 4 and struts 9 may be welded together and so constitute a rigid support for the bearings 7 and 8 which is both strong and cheap as well as easy to form. This is to be compared with the A-frame and cantilever support of one known type of coupling.

Moreover, the coupling described above has a number of advantages when compared with known couplings. Thus, the simple arrangement of the bearings 7 and 8 permits the yawing axis 13 to be moved as close to the humping axis 6 as desired. This substantially increases the stability of the tractor and trailer combination during cornering as the distortion of the plane of support during, say a 90° turn (the worst case) is reduced. Ideally, of course, the horizontal distance between the yawing axis 13 and the humping axis 6 should be zero. However, this would prevent any humping between the tractor 1 and the trailer 2 as the bearings 7 and 8 would jam against the back of the tractor. Consequently, the horizontal distance between the humping axis and the yawing axis 13 is so chosen that humping through 18° either up or down is possible, this angle being chosen to be larger than any likely to be encountered in use.

Another advantage of this coupling 3 is that the rolling axis 10 is situated relatively high with respect to the humping axis 6 which also contributes to increased stability.

As the rolling bearing pivot pin 7b is supported in double shear, this coupling provides for adequate bearing length for moments in the region of 45 tons force/feet. Moreover, the arrangement of the coupling 3 permits the use of a hefty 6 inch diameter pivot pin 8b and a similarly hefty pivot bearing sleeve 8a, so a considerably stronger arrangement is possible than was the case with known couplings. Moreover, the transferred weight is directed downwardly along the yawing axis 13 and so the forces are taken up by the hefty pivot bearing 8. In this way, the coupling 3 can transfer a weight of up to 15,000 lbs. from the trailer 2 to the rear driving wheels of the tractor 1. This results in a "usable" rimpull of 4,500–6,000 lbs. in the adverse conditions mentioned above, and this means that a load of 12 to 20 tons can be moved depending upon the prevailing conditions.

FIG. 7 shows a second form of coupling. As this coupling is very similar to that shown in FIGS. 1 to 6, like reference numerals have been used for like parts, and only the modified parts of the coupling will be described. Thus, this vehicle coupling has four struts 9 of equal length which results in a reduced number of basic parts and a more symmetrical design. More importantly, the sleeve 8a and the brackets 11 are integrally formed as a steel casting rather than being a composite structure as shown in FIGS. 1 to 6. This integral casting increases the strength of the coupling. Another modification is to replace the tapered boss of the embodiment of FIGS. 1 to 6 with a cylindrical bobbin 8c having a central portion of reduced diameter. A pair of flanges 12a, which are welded to the draw bar 12, are arranged to be a press fit over the two larger diameter portions of the bobbin 8c. This arrangement provides a more versatile way of connecting draw bars to the coupling, as many different types of draw bar can be accommodated, merely by suitable design of the flanges 12a.

In each of the embodiments described above, the pivot pin 8b is held in position within its sleeve 8a by the force of gravity. This ensures that the coupling 3 can be disconnected fairly easily. Where necessary, however, additional means could be provided for holding the pivot pin 8b in its sleeve 8a.

Yet another advantage of each of these couplings, is that the height of the arrangement above the rolling axis 10 is less than half the inside rear tyre spacing of the tractor, and the rolling bearing 7 is such as to allow pivoting through 95° each side of the vertical. In the unlikely event of the trailer 2 overturning, these two factors prevent the coupling 3 or the top of the draw bar 12 striking one of the rear tyres of the tractor 1 and capsizing the tractor with the trailer. With a six foot rear tyre track and tyres of 23 inch width, no serious reduction in axle capacity results from this arrangement.

Another important advantage of these couplings is the ease with which changes can be made to the span, (that is to say the distance between the arms 4) and to the height between the humping and rolling axes 6 and 10. Both these dimensions can easily be changed by modifying the lengths and angles of the struts 9. Such changes may be necessary to accomodate the coupling to different types of tractor. Thus, although the standard span of the coupling is 36 inches, one common type of tractor requires a coupling having a span of 28 inches.

FIGS. 8 and 9 show a third form of vehicle coupling. Again as this coupling is similar to that of FIGS. 1 to 6, like reference numerals have been used for like parts, and only the modified parts of the coupling will be described. The main difference between this coupling and the two embodiments described above is that the vertical bearing assembly is "inverted", that is to say the pivot pin 8b is mounted on the pivot bearing pin 7b and the vertical bearing sleeve 8a is attached to the draw bar 12. Actually, the pivot pin 8b is integrally formed with the brackets 11 which are supported on the horizontal pivot pin 7b. This integral construction of the parts 8b and 11 is a medium tensile steel casting which has the advantages of being simple, light and easy to machine. The bearing sleeve 8a is provided with connectors 8f by means of which it can be detachably (or permanently) fixed to the draw bar 12 which may be a "goose-neck" draw bar. A retaining plate and dust cover 15 is provided for the top of the vertical bearing 8. Another difference between this form of vehicle coupling ad those of the earlier embodiments is that the rear of the arms 4 are swept upwardly so as to afford extra ground clearance.

The main advantage of this form of vehicle coupling over the first and second forms is that the height of the bearing 8 can be reduced as the boss or bobbin 8c is no longer required. This means that the height of the rolling axis 10 above the humping axis 6 can be increased without this height exceeding half the inside rear tyre spacing of the tractor. This results in increased stability whilst maintaining the advantage of preventing the tractor overturning with the trailer in the unlikely event of the trailer capsizing. Another advantage of this form of coupling is that the bearing height of the vertical bearing 8 can be increased which results in a stronger form of vehicle coupling. Yet another advantage of raising the height of the rolling axis 10 is that this can be lifted clear of the rearward facing projections which are provided on most tractors at about the level of their rear axis. This in turn means that the dimension "x" can be reduced (it no longer being necessary for this dimension to be sufficiently large to prevent the coupling catching such projections) which also results in increased stability.

Figure 10:
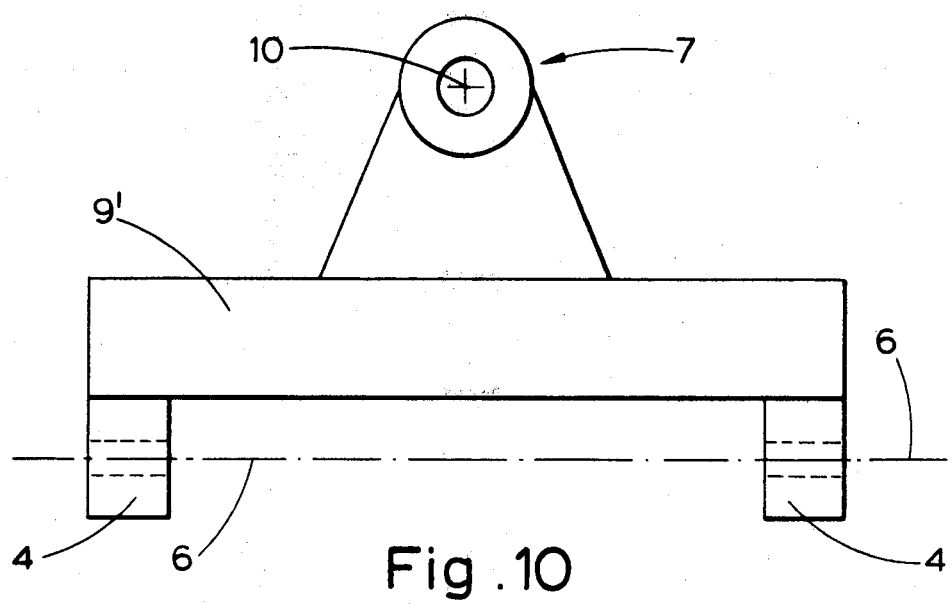
FIG. 10 is an end elevation of a fourth form of vehicle coupling looking from the tractor.
Figure 11:
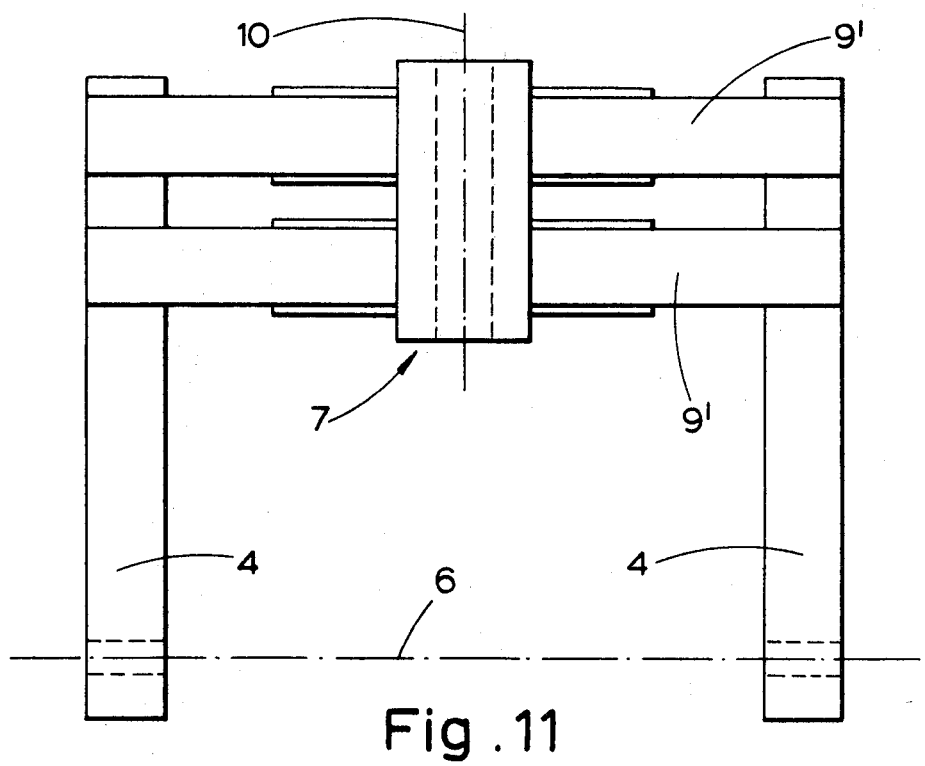
FIG. 11 is a plan view of the fourth form of vehicle coupling.

FIGS. 10 and 11 show a fourth form of vehicle coupling which is intended to use with trailers having low-level draw bars. Here the actual arrangement of bearings 7 and 8 is identical with that of the embodiment of FIGS. 8 and 9. However, the two pairs of obliquely inclined, convergent struts 9 of the earlier embodiments are replaced by a single pair of parallel horizontal struts 9'.

Other advantages of all the different forms described above are their low weight and low cost, that they avoid the use of fabricated components that are subject to fatigue, and that all the wearing components can be easily replaced.

Obviously, a number of modifications could be made to the couplings described above. For example, the particular arrangement of the arms 4 and struts 9 could be replaced by U-shaped bars or by any other suitable arrangement. Moreover, particularly in the embodiments of FIGS. 8 to 11, the diameter of the vertical pivot pin 8b could be much larger than 6 inches. The increased diameter of the vertical bearing 8, together with the fact that this bearing can be positioned higher in the embodiments of FIGS. 8 to 11, results in a very large increase in transferred weight and hence in payload.

I claim:

1. A weight transfer hitch for connecting an agricultural tractor having a rear axle to a trailer having a coupling member, said hitch comprising:

a pair of parallel linkage arms adapted to be pivotably attached to said tractor about a transverse horizontal axis positioned below and forwardly of said rear axle, said arms having free ends extending rearwardly beyond said axle;

a horizontal pivot bearing having an outer sleeve and an inner pin pivotally mounted within said sleeve;

means for supporting said horizontal pivot bearing above said linkage arms, said supporting means including two pairs of obliquely inclined convergent struts, the lower, wider spaced ends of the struts of each pair being fixed to a respective one of said arms, and the upper, convergent ends of the struts of each pair being fixed to said sleeve;

a vertical pivot bearing having a first member adapted to be fixedly connected to said coupling member and a second member pivotally movable relative to said first member; and means for fixedly connecting said second member to said inner pin.

2. A weight transfer hitch according to claim 1, wherein the linkage and the support means are made from straight metallic sections.

3. A weight transfer hitch according to claim 2, wherein said metallic sections are welded together.

4. A weight transfer hitch according to claim 1, wherein the horizontal pivot bearing is positioned vertically below the base of the vertical pivot bearing.

5. A weight transfer hitch according to claim 1, wherein said first member is a vertical pivot pin which depends from the coupling member and said second member is a vertical pivot bearing sleeve.

6. A weight transfer hitch according to claim 5, wherein said vertical pivot bearing sleeve is a plain sleeve.

7. A weight transfer hitch according to claim 6, wherein the internal diameter of said vertical pivot bearing sleeve is 6 inches.

8. A weight transfer hitch according to claim 1, wherein said first member is a vertical pivot bearing sleeve and said second member is a vertical pivot pin.

9. A weight transfer hitch according to claim 8, wherein the two ends of the horizontal pivot pin are fixed to said second member of the vertical pivot bearing by means of brackets.

10. A weight transfer hitch according to claim 9, wherein said vertical pivot pin is integral with said brackets.

11. A weight transfer hitch according to claim 8, wherein said vertical pivot bearing sleeve is a plain sleeve having an internal diameter of 6 inches.

12. A weight transfer hitch according to claim 1, wherein the two ends of the horizontal pivot pin are fixed to said second member of said vertical pivot bearing by means of brackets.

13. A weight transfer hitch according to claim 12, wherein said second member is a vertical pivot bearing sleeve and is integral with said brackets.

14. A weight transfer hitch according to claim 1, wherein the distance between the top of the vertical pivot bearing and the axis of the horizontal pivot bearing is less than half the distance between the rear tyres of the tractor.

* * * * *